United States Patent
Fujii et al.

(10) Patent No.: US 8,733,243 B2
(45) Date of Patent: May 27, 2014

(54) ROLLER IMPRINTER AND PRODUCTION METHOD OF IMPRINTED SHEET

(75) Inventors: Akiyoshi Fujii, Osaka (JP); Nobuaki Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 13/064,157

(22) Filed: Mar. 8, 2011

(65) Prior Publication Data

US 2011/0174174 A1    Jul. 21, 2011

Related U.S. Application Data

(62) Division of application No. 12/921,285, filed as application No. PCT/JP2009/070555 on Dec. 8, 2009.

(30) Foreign Application Priority Data

Dec. 17, 2008   (JP) ................................. 2008-321349

(51) Int. Cl.
*B41F 19/02*   (2006.01)
*B44C 1/24*    (2006.01)

(52) U.S. Cl.
USPC ................... 101/6; 101/23; 101/32; 101/483

(58) Field of Classification Search
USPC .............. 101/3.1, 5, 6, 22, 23, 24, 32, 33, 34, 101/479, 480, 483
See application file for complete search history.

(56) References Cited

U.S. PATENT DOCUMENTS

| | | | |
|---|---|---|---|
| 3,386,130 A | 6/1968 | Grunewald et al. | |
| 3,874,836 A * | 4/1975 | Johnson et al. | 425/363 |
| 4,240,257 A | 12/1980 | Rakowsky et al. | |
| 5,205,210 A * | 4/1993 | Mathis | 101/32 |
| 5,425,848 A | 6/1995 | Haisma et al. | |
| 2005/0150643 A1 | 7/2005 | Chartouni et al. | |
| 2007/0014886 A1 | 1/2007 | Hennessey et al. | |
| 2007/0159698 A1 | 7/2007 | Taguchi et al. | |
| 2009/0060578 A1 * | 3/2009 | Oohara et al. | 399/167 |
| 2009/0211912 A1 | 8/2009 | Taguchi et al. | |
| 2009/0252825 A1 | 10/2009 | Taguchi et al. | |

FOREIGN PATENT DOCUMENTS

| | | |
|---|---|---|
| EP | 0 805 044 B1 | 10/2002 |
| EP | 1376038 A1 | 1/2004 |
| EP | 1 972 997 | 9/2008 |
| JP | 05-016230 | 1/1993 |
| JP | 07-005693 | 1/1995 |

(Continued)

OTHER PUBLICATIONS

Japanese Office Action dated Sep. 14, 2010.

(Continued)

*Primary Examiner* — Ren Yan
(74) *Attorney, Agent, or Firm* — Harness, Dickey & Pierce, P.L.C.

(57) ABSTRACT

At least one embodiment of the present invention provides a roller imprinter that allows easy replacement of a transfer roller, and a method of producing an imprinted sheet. In at least one embodiment, a roller imprinter is disclosed for transferring a pattern on a surface of a transfer roller to a surface of a workpiece sheet through rotation of the transfer roller, the roller imprinter including an axis shaft or rotation for the transfer roller, and the axis of the shaft being non-coincident with the rotation axis of the transfer roller.

14 Claims, 9 Drawing Sheets

(56) References Cited

FOREIGN PATENT DOCUMENTS

| | | |
|---|---|---|
| JP | 2001-264520 | 9/2001 |
| JP | 2003-043203 | 2/2003 |
| JP | 2003-531962 | 10/2003 |
| JP | 2004-205990 | 7/2004 |
| JP | 2004-223724 | 8/2004 |
| JP | 2005-144698 | 6/2005 |
| JP | 2005-156695 | 6/2005 |
| JP | 2005-161531 | 6/2005 |
| JP | 2007-98742 | 4/2007 |
| JP | 2007-203576 | 8/2007 |
| JP | 2007-281099 | 10/2007 |
| WO | WO 2006/059686 | 6/2006 |

OTHER PUBLICATIONS

International Search Report.

Office Action for corresponding U.S. Appl. No. 12/921,285 dated Mar. 16, 2011.

Office Action for corresponding U.S. Appl. No. 12/921,285 dated Jul. 12, 2011.

Office Action for corresponding U.S. Appl. No. 12/921,285 dated May 4, 2012.

Translation of Chinese Office Action corresponding application No. 2009-80106916.2 dated Nov. 28, 2012.

Getong Guo et al. "Retrospect and Propsect of Aluminium Anodizing", vol. 33, No. 1, pp. 43-45.

Decision on Grant for corresponding Russian patent application No. 2010147914 issued on Jul. 12, 2012 (in English).

O. Schwartz et al., "Pererabotka plastmass," Saint Petersburg, 2005, pp. 47-48, 300-304.

Office Action for corresponding U.S. Appl. No. 12/921,285 dated Oct. 25, 2012.

\* cited by examiner (a)

(b)

(a)

(b)

(a)

(b)

ROLLER IMPRINTER AND PRODUCTION METHOD OF IMPRINTED SHEET

CROSS-REFERENCE TO RELATED APPLICATIONS

This application is a divisional of and claims priority under 35 U.S.C. §§120/121 to U.S. patent application Ser. No. 12/921,285, filed on Sep. 7, 2010, which is a National Stage of International Application No. PCT/JP2009/070555, filed on Dec. 8, 2009, which claims the benefit of Japanese Patent Application No. 2008-321349, filed on Dec. 17, 2008. The disclosures of each of the above applications are incorporated herein by reference in their entirety.

TECHNICAL FIELD

The present invention relates to a roller imprinter and a production method of an imprinted sheet. More particularly, the present invention relates to a roller imprinter suitably used for producing a resin sheet with a low reflection treatment-provided surface and a production method of an imprinted sheet.

BACKGROUND ART

A technology of transferring an undulated pattern of a nanometer size (0.001 to 1 µm) (hereinafter, also referred to as a "nanostructure") of a mold to a resin material formed on a substrate by pressing them together, so-called nanoimprint technology, has attracted attention recently. Applications of the nanoimprint technology to optical materials, microfabrication of ICs, substrates for clinical laboratory test, and the like are now being researched. This technology has been achieved through development of a hot embossing technology, which is known in preparation of optical discs, and S. Y. Chue et al. proved in 1995 that this technology allows embossing of features as small as 10 nm.

Nano-scale fabrication by conventional photolithography involves exposure through a mask, and this exposure causes diffraction phenomenon. In order to eliminate poor resolution resulting from this phenomenon, light at a short wavelength is needed for the exposure. This deficiency of the nano-scale fabrication is followed by a need of a more complicated device, and an increase in costs, for example. The nanoimprint technology is free from the above-mentioned deficiencies because in this technology, nanometer-sized patterns can be easily formed by embossing. Further, through this technology, optical components with a nanometer-sized structure can be mass-produced inexpensively. Thus, the nanoimprint technology has attracted attention.

Thermal nanoimprint and UV nanoimprint are known as the nanoimprint technology. According to the UV nanoimprint, for example, a mold with nanostructures is pressed against a UV-curable resin thin film formed on a substrate, and the film is irradiated with UV light to yield a thin film with nanostructures (hereinafter, also referred to as a nanoimprinted sheet) in the inverse shape of the mold. When these nanoimprint technologies are used in a research phase, preparation of nanoimprinted sheets generally involves use of a plate mold and batch process. In order to mass-produce the nanoimprinted sheets at a low cost by the nanoimprint technology, roll-to-roll process is preferable to batch process. This is because the roll-to-roll process allows continuous production of the nanoimprinted sheets by a transfer roller having an outer circumference surface on which nanostructures are formed.

Briefly, the roll-to-roll process is mentioned below. With respect to a nanoimprint technology involving the roll-to-roll process, for example, Patent Document 1 discloses a method including transferring a pattern of a small transfer roller 191 onto a UV-curable resin coated on a large transfer roller 192 while the pattern is extended by sequentially moving the transfer roller 191 laterally as shown in FIG. 13. However, in this method, the pattern is formed on the resin on the large transfer roller 192 by extending the pattern of the small transfer roller 191. Therefore, the pattern of the formed nanostructures usually has a seam. Thus, this method is not suitably used for forming nanostructures over a workpiece with a width larger than that of the small transfer roller 191.

With respect to rollers used in technologies other than the nanoimprint technology, which are not the transfer rollers used for the roll-to-roll process, for example, Patent Documents 2 and 3 disclose a method of producing a roller with an undulated pattern directly formed thereon. When this method is adapted in the nanoimprint technology, a transfer roller with nanostructures needs to be equipped with, for example, a bearing mechanism for coupling the transfer roller with a nanoimprinter. This leads to an increase in costs on the transfer roller, which is a problem in view of mass-production.

Further, for example, Patent Document 4 discloses, in FIG. 7, a method of mounting a cylindrical member having an undulated pattern on a roller. According to this method, it is difficult to form a continuous nanopattern by bending the member around the outer circumference of the roller, and as a result, the transfer roller has a seam in the nanopattern.

Next, optical materials with nanostructures are mentioned. In optical materials, a "moth-eye structure" is known as one type of the nanostructure. The moth-eye structure includes, for example, a large number of conical protrusions of a size much smaller than visible light. Optical elements with such a moth-eye structure include one having a moth-eye structure formed on a transparent substrate surface. In this moth-eye structure, the size of the protrusion is much smaller than a visible light wavelength, and therefore, visible light entering the transparent substrate surface recognizes that a refractive index continuously changes from air to the transparent substrate because of the protrusion, and as a result, it does not recognize the air/transparent substrate interface as a refractive index mismatch interface. Thus, light reflection on the transparent substrate surface can be markedly decreased, for example, as disclosed in Patent Documents 6 to 9.

In a technology of producing optical materials with such a nanostructure, for example, Patent Documents 5 to 8 disclose a method of using an aluminum substrate having a surface with nanometer-sized cavities formed thereon by anodization. According to this method, nanometer-sized structures can be formed on the surface microscopically in a random placement and macroscopically in a uniform distribution. Specifically, this method is used for producing the transfer roller, whereby seamless nanostructures, which are needed for continuous production, can be formed on a surface of a columnar or cylindrical mold roller (for example, see FIG. 19 of Patent Document 8).

When such a transfer roller with the nanostructures is adapted for use in a nanoimprinter used for the roll-to-roll process, the transfer roller is not able to be used permanently and needs to be replaced after being used for a certain period. Therefore the transfer roller is strongly desired to be inexpensive.

It is effective in meeting this demand to use a cylindrical transfer roller and to make the structure of such a replaceable transfer roller simple. However, the use of the cylindrical transfer roller has the following disadvantages.

The transfer roller is required to be mounted on a nanoimprinter with high control accuracy for its position and direction because the transfer roller transfers the nanostructure onto a surface of a workpiece sheet while uniformly pressing the sheet. When a cylindrical transfer roller is used, a member serving as the axis of rotation for the roller is needed. In such a case, on the inner circumference side of the cylindrical transfer roller, an axis shaft having the rotation axis coincident with that of the transfer roller can be mounted. However, it makes the replacement of the transfer roller complicated to mount the transfer roller on the imprinter with high accuracy so that its rotation axis is coincident with that of the shaft. In view of this, the transfer roller is required to be more easily replaced.

Further, a treatment (pre-transfer treatment) where a workpiece sheet before being coated with a resin is made strained and made to travel is performed before the transfer, thereby ensuring that the sheet can travel in the imprinter smoothly. This pre-transfer treatment prevents the workpiece sheet, which is to yield a product, from getting twisted or wrinkled. This pre-transfer treatment possibly causes the following problems, for example. When a foreign substance and the like is caught between the workpiece sheet and the transfer roller, for example, the transfer roller surface is possibly damaged, and the pattern for forming nanostructures on the surface might be deformed, or a demolding agent coated on the transfer roller is possibly removed. Particularly the nanometer-sized pattern prepared by the anodization is easily deformed by a local intense pressure that is generated by the foreign substance and the like because the base material is aluminum. This possibly leads to poor transfer onto the workpiece sheet, a reduction in yield, and an increase in costs arising from the replacement of the transfer roller. Particularly when the demolding agent is removed from the transfer roller surface, a resin material forming the nanostructure adheres to the transfer roller, and this causes the poor transfer onto the sheet. Therefore, it has been desired that the transfer surface of the transfer roller is protected against the damages.

PRIOR ART REFERENCES

Patent Documents

[Patent Document 1]
Japanese Kokai Publication No. 2007-203576
[Patent Document 2]
Japanese Kokai Publication No. 2005-144698
[Patent Document 3]
Japanese Kokai Publication No. 2005-161531
[Patent Document 4]
Japanese Kokai Publication No. 2007-281099
[Patent Document 5]
Japanese Kohyo Publication No. 2003-531962
[Patent Document 6]
Japanese Kokai Publication No. 2003-43203
[Patent Document 7]
Japanese Kokai Publication No. 2005-156695
[Patent Document 8]
WO 2006/059686
[Patent Document 9]
Japanese Kokai Publication No. 2001-264520

Disclosure of Invention

The present invention is devised considering the aforementioned situations. An object of the present invention is to provide a roller imprinter that allows easy replacement of the transfer roller, and a method of producing an imprinted sheet.

The present inventors made various investigations on a roller imprinter including a cylindrical transfer roller, and noted that an axis shaft whose axis is coincident with the rotation axis of the transfer roller makes it complicated to mount the transfer roller on the imprinter when the transfer roller is replaced. Then the inventors found that when the imprinter is free of such an axis shaft, the transfer roller can be easily mounted on and dismounted from the imprinter, resulting in easy replacement of the transfer roller, which is a consumable (replacement) member. Further, the inventors noted that the pre-transfer treatment constitutes one factor causing the damages on the transfer roller surface. Then the inventors found that the damages can be reduced by previously adjusting tension of the workpiece sheet prior to bringing the sheet into contact with the transfer roller. The inventors also found that use of at least two rollers is suitable for the tension adjustment of the workpiece sheet. Further, the inventors found that by using at least three rollers, the workpiece sheet can be provided with the transfer while being uniformly pressed without getting twisted or wrinkled, and thus, an imprinted sheet with a uniform thickness can be produced without the damages on the transfer roller surface. Thus, the present inventors have found the solution of the aforementioned problems and arrived at the present invention.

One aspect of the present invention provides a roller imprinter for transferring a pattern on a surface of a transfer roller to a surface of a workpiece sheet through rotation of the transfer roller, the roller imprinter including an axis shaft of rotation for the transfer roller, the axis of the shaft being non-coincident with the rotation axis of the transfer roller.

Another aspect of the present invention provides a roller imprinter for transferring a pattern on a surface of a transfer roller to a surface of a workpiece sheet through rotation of the transfer roller, the roller imprinter including: at least two tension rollers for straining the sheet; and at least three pinch rollers for pinching the sheet with the transfer roller, the roller imprinter being configured to strain the sheet between a plurality of the tension rollers, and then to bring the sheet into contact with the transfer roller, and on transferring the pattern to the surface of the sheet, to pinch the sheet by the transfer roller and the pinch rollers, and to rotate the transfer roller while holding the transfer roller by the pinch rollers.

Yet another aspect of the present invention provides a method of producing an imprint sheet having a surface with a pattern formed thereon, the method including use of a workpiece sheet, a transfer roller having a surface with a pattern formed thereon, at least two tension rollers for straining the sheet, at least three pinch rollers for pinching the sheet with the transfer roller, and the method including: straining the sheet between a plurality of the tension rollers and then bringing the sheet into contact with the transfer roller; and transferring the pattern to the surface of the sheet by holding and rotating the transfer roller by the pinch rollers while pinching the sheet between the transfer roller and the pinch rollers.

The present invention is mentioned in more detail below.

The imprinter of the present invention transfers a pattern on a surface of a transfer roller to a surface of a workpiece sheet through rotation of the transfer roller. This imprinter allows continuously performing embossing to the workpiece sheet and release of the sheet from the transfer roller, and as a result, products having a surface with a desired pattern formed thereon can be mass-produced at fast speeds.

The imprinter of the present invention according to a first embodiment includes an axis shaft of rotation for the transfer roller, the axis of the shaft being non-coincident with the rotation axis of the transfer roller. The transfer roller has a surface with a desired pattern formed thereon, and rotates, thereby transferring the pattern onto the sheet. According to the first embodiment, the imprinter is free of an axis shaft whose axis is coincident with the rotation axis of the transfer roller.

The above-mentioned conventional imprinter is equipped with an axis shaft for rotating the transfer roller, and the transfer roller is mounted on the imprinter so that the rotation axis of the transfer roller is coincident with the rotation axis of the shaft. Such an axis shaft is not mounted on the imprinter of the first embodiment of the present invention, as mentioned above. This obviates the need of mounting the transfer roller on the imprinter such that the rotation axis of the transfer roller is coincident with the rotation axis of the shaft. As a result, mounting and dismounting of the transfer roller on/from the imprinter become easier, and therefore the transfer roller, which is a consumable roller, can be easily replaced.

According to the first embodiment, it is preferable that the transfer roller is configured to rotate while being held by at least three pinch rollers. As a result, the workpiece sheet can be uniformly pressed, thereby yielding an imprinted sheet with a uniform thickness. Further, transfer rollers of unworkable non-metal materials such as a glass or ceramic material can be used because the transfer roller itself has no need to have an axis shaft, and the like, can be held by the pinch rollers. Accordingly, transfer rollers with transparency, an excellent heat-dissipating performance, and the like, can be used. For example, in UV or thermal imprint for an opaque sheet, a reduction in time required for the transfer can be expected.

The imprinter of the first embodiment may further include at least two tension rollers, wherein the sheet is made strained between a plurality of the tension rollers, and then brought into contact with the transfer roller. Such tension rollers are mentioned in detail in a below-mentioned second embodiment of the present invention.

The imprinter of the second embodiment of the present invention includes, for example, at least two tension rollers for straining the sheet and at least three pinch rollers for pinching the sheet with the transfer roller. According to this embodiment, first, the imprinter strains the sheet between at least two tension rollers before bringing the sheet into contact with the transfer roller, thereby adjusting tension of the sheet, and then brings the sheet and the transfer roller into contact with each other to initiate the transfer.

According to this, the workpiece sheet is adjusted for its tension without being in contact with the transfer roller, and the damages on the transfer roller surface, which are caused by the pre-transfer treatment, can be eliminated. The workpiece sheet can be coated with a resin before contacting the transfer roller, if necessary, so that the resin can serve as a buffer to substantially prevent the contact between the transfer roller and the workpiece sheet. The damages on the transfer surface can be even more effectively suppressed.

In the transfer, the imprinter holds and rotates the transfer roller by the pinch rollers while pinching the sheet between the transfer roller and the pinch rollers. Thus, the imprinter provides a pressure treatment for the sheet with its tension being adjusted by the transfer roller, thereby preventing the workpiece sheet from getting twisted or wrinkled at the time of the transfer. Thus, an imprinted sheet with a uniform thickness can be produced.

According to the first and second embodiments, it is preferable that at least two of the pinch rollers also serve as the tension rollers. According to this embodiment, the effects of the present invention can be obtained by a simpler configuration of the imprinter.

According to the first and second embodiments, the workpiece sheet is not especially limited as long as a desired pattern can be formed on the workpiece sheet by pressing the transfer roller thereto. Preferable is a transfer sheet of a resin material, for example. Examples of such a resin workpiece sheet include those on which a structure can be directly formed and those including a base film and a resin coating (hereinafter, referred to as a workpiece resin) formed thereon. In the latter sheets, embossing is provided for the resin coating in an uncured or semi-cured state, thereby printing a structure onto the resin coating. The former is mainly used in thermal imprint, and the latter in UV imprint. Exemplary materials for forming the base film include, but not especially limited to, triacetyl cellulose (TAC), and polyethylene terephthalate (PET). Resins that can be cured by energy beams, e.g., electromagnetic waves such as UV light and visible light are preferable as the workpiece resin.

The size, shape, and the like of the above-mentioned structure are not especially limited, and the structure may be a nanostructure. According to the present invention, such a fine structure can be preferably used. In the present description, the nanostructure is intended to refer to those having a surface structure composed of recesses each having a depth of 1 nm or larger and smaller than 1 µm (=1000 nm) and/or protrusions each having a height of 1 nm or larger and smaller than 1 µm (=1000 nm). Examples of the nanostructures include a moth-eye structure and a wire grid structure.

The preferable embodiments of the first and second embodiments include one in which the transfer roller has a cylindrical shape, a shaft component is disposed inside the transfer roller, and the shaft component and the transfer roller have different and independent axes of rotation located at different positions from each other. According to this method of rotating the cylindrical transfer roller, a seamless surface structure can be formed. The cylindrical transfer roller has a simple structure, so that the cost on the consumable component, the transfer roller can be decreased. The transfer roller is mounted on the imprinter with the shaft component that is disposed inside the transfer roller, whereby the transfer roller can be easily mounted on and dismounted from the imprinter. Thus the transfer roller can be easily replaced. Also the shaft component is just disposed inside the transfer roller, and therefore can be easily replaced if necessary.

According to another preferable embodiment of the first and second embodiments, for example, the transfer roller is configured to be held by the shaft component when the sheet is strained, and on transferring the pattern to the surface of the sheet, to pinch the sheet with the at least three pinch rollers by a pressure applied by the shaft component. According to this embodiment, at the time of replacement of the transfer roller, the workpiece sheet remains strained as in the tension adjustment, and the transfer roller moves away from the strained sheet by being held by the shaft component. Thus the transfer roller is replaced while being held by the shaft component, and therefore it can be mounted and dismounted from the imprinter without contacting the transfer roller surface.

Further, the transfer roller can be replaced while the workpiece sheet is strained. Therefore, for example, even when some embossing defect occurs in the middle of a long workpiece sheet or some foreign substance is caught between the sheet and the transfer roller and thereby repair, adjustment and the like for the transfer roller is required, there is no need to cut the sheet. According to this, the workpiece sheet is not wasted and the time required for the repair, adjustment and the like can be shortened.

This is particularly effective when the tube length of the transfer roller is longer than 1 m. For example, when the workpiece sheet has a width equivalent to that of a film constituting a polarizer that is located on an LC display surface, the polarizer has a width of about 1.5 m in a production process, so that the tube length of the roller is naturally 1.6 to 1.7 m. When the transfer roller with such a length is made of an aluminum material, the thickness thereof is required to be about 10 mm to 20 mm in view of its stiffness.

A TAC film that constitutes the polarizer typically has a length of about 3000 m. In view of providing a film having such a length with the transfer, when the transfer roller is estimated to be able to effectively perform the transfer operation up to 2000 to 5000 times, the outer diameter thereof is required to be about 200 to 500 mm. The transfer roller of such a size is too heavy to be mounted on the imprinter with user's hands, and its surface can not be touched when nanometer-sized structures are formed thereon.

In contrast to this; according to the above-mentioned preferable embodiment, the transfer roller is just dismounted from the shaft component when replaced, and further the shaft component is able to move the transfer roller. This can save a lot of trouble of replacing the transfer roller, and the transfer roller surface becomes less likely to be touched.

According to the above-mentioned preferable embodiment, the transfer roller can be stably held by only at least three pinch rollers. Further, it is preferable that on transferring the pattern to the surface of the sheet, the position of the axis of rotation of any of the pinch rollers is horizontally higher than that of the transfer roller. In this case, all the three pinch rollers can apply a pressure to the transfer roller to more stably hold the transfer roller.

According to the first and second embodiments, it is preferable that the transfer roller has a substantially seamless surface. According to this, the transfer pattern on the outer circumference surface of the transfer roller can be formed on the surface of the sheet substantially without a seam of the pattern. When the resulting sheet is attached to, for example, a display device as an ultra-low reflective sheet, occurring of uneven display can be prevented. The term "substantially seamless" is intended to refer to the state where the presence of a seam can not be optically observed. Specifically, it preferably refers that the outer circumference surface of the transfer roller has a difference in surface height, which is linearly formed, of 0.6 μm or smaller. It is also preferable that a pattern-free linear region with larger than 0.6 μm in width is not formed on the outer circumference surface of the transfer roller. The transfer roller with a substantially seamless surface can be prepared by directly forming a pattern on the outer circumference surface of a cylindrical roll member. In contrast to this, when a plate roll member on which a transfer pattern has been previously formed is rolled up to joint the both ends thereof to each other, a seam is formed at the joint part.

The transfer roller of the first and second embodiments may be an aluminum cylindrical roller having a surface defined by nanometer-sized cavities formed by anodization; a glass or ceramic roller; and a roller that is formed by coating an aluminum thin film on the outer surface of a cylindrical glass or ceramic roller and providing nanometer-sized cavities on the surface by anodization. It is particularly preferable that the transfer roller is a glass or ceramic cylindrical member having an aluminum thin film that is formed on its outer surface and that has nanometer-sized cavities formed by anodization. According to the transfer roller of such an embodiment, the transfer pattern can be easily formed on the outer surface of an unworkable glass or ceramic cylindrical member.

According to the first and second embodiments, the transfer roller further includes a cooling mechanism. According to this, an increase in temperature of the transfer roller can be suppressed. The cooling mechanism is not especially limited, and for example, forced air cooling and the like can be accomplished by disposing an axis not directly in contact with the inside of the transfer roller. Specifically, used may be a cooling mechanism including: a fin disposed on the inner surface of the transfer roller or a cylindrical fin disposed on the inner surface side of the transfer roller; and a duct for supplying a cooling fluid to the fin or the cylindrical fin. This cooling mechanism is preferable because its configuration is simple but enough to provide cooling effects.

The following will mention one example of the production method of the imprinted sheet of the present invention. In the present invention, the imprinted sheet is not especially limited as long as it is a sheet with a desire shape formed by transfer. A sheet with a nanostructure is preferable, and a resin sheet with a nanostructure is particularly preferable. For example, an imprinted sheet with a moth-eye structure formed by transfer on its surface can be preferably used as an anti-reflection film.

According to one example of the embodiment in the present invention, the method of producing an imprinted sheet involves use of a workpiece sheet, a transfer roller having a surface with a pattern formed thereon, at least two tension rollers for straining the sheet, and at least three pinch rollers for pinching the sheet with the transfer roller. According to this embodiment, first, the imprinter strains the workpiece sheet between the at least two tension rollers. Next, the imprinter brings the transfer roller into contact with the sheet. Then, the imprinter transfers the pattern of the transfer roller to the surface of the sheet by holding and rotating the transfer roller by the at least three pinch rollers while pinching the sheet between the transfer roller and the at least three pinch rollers. When at least two of the pinch rollers also serve as the tension rollers, the present embodiment can be achieved by a simpler configuration.

According to this embodiment, the workpiece sheet is strained between the tension rollers, and then the transfer roller and the sheet are brought into contact with each other, so that an imprinted sheet having no damages on its transfer surface can be produced. Further, the imprinter performs the transfer by holding and rotating the transfer roller by the at least three pinch rollers while pinching the sheet between the transfer roller and the at least three pinch rollers. Therefore, the sheet can be uniformly pressed to easily yield an imprinted sheet with a uniform thickness.

With respect to the imprinter and the imprinted sheet of the present invention, the imprinter includes a nanoimprinter, and the imprinted sheet includes a nanoimprinted sheet. Specifically, the imprinter of the present invention is, but not limited to, suitably adapted for nanoimprint. For example, the prevention of possible damages at the time of mounting the transfer roller and the advantages of the material for the transfer roller are not only limited to nanoimprint.

According to the imprinter and the imprinted sheet of the present invention, the transfer roller itself is free of the axis shaft whose axis is coincident with the rotation axis of the transfer roller, so that the roller might snake its way and thereby the workpiece sheet might get twisted. In view of this, the transfer roller can be positioned by disposing bearings on the ends thereof, thereby controlling movement in the lateral direction of the transfer roller. Thus, movement of the transfer roller in the rotation axis direction can be controlled. The positioning of the transfer roller can be accomplished without any regulation for movement of the transfer roller in its rotation direction by making the rotation direction of the bearings coincident with the movement direction of the ends of the transfer roller.

As long as the roller imprinter of the present invention includes the above-mentioned transfer roller, tension rollers, and pinch rollers as a component, it may or may not include other components.

Effect of the Invention

The roller imprinter and the production method of the imprinted sheet of the present invention allow easy replacement of the transfer roller.

BRIEF DESCRIPTION OF DRAWINGS

FIG. 1(a) is a schematic view showing a main part of an imprinter at the time of performing the tension adjustment according to the present Embodiment. FIG. 1(b) is a schematic view of the main part of the imprinter at the time of performing the transfer according to the present Embodiment.

FIG. 2 is an explanation view schematically showing a configuration of the imprinter at the time of performing the tension adjustment according to the present Embodiment.

FIG. 3 is a perspective view showing a configuration of a transfer roller and a shaft according to the present Embodiment.

FIG. 4 is a perspective view showing a configuration of the imprinter at the time of performing the transfer according to the present Embodiment.

FIG. 5 is a perspective view showing a configuration of the main part of the imprinter at the time of performing the transfer according to the present Embodiment.

FIG. 6 is a cross-sectional view showing a configuration of an imprinted sheet according to the present Embodiment.

FIGS. 7(a) and 7(b) are explanation views each showing refractive index change on an interface between air and a surface structure of the imprinted sheet of FIG. 6.

FIG. 8 is a cross-sectional view schematically showing a main part of a thermal imprinter.

FIG. 9(a) is a perspective view of a transfer roller including a cooling mechanism. FIG. 9(b) is a cross-sectional view schematically showing a configuration of the cooling mechanism.

FIG. 10(a) is a schematic view showing the main part of the imprinter at the time of performing the tension adjustment according to a modified example of the present Embodiment. FIG. 10(b) is a schematic view showing the main part of the imprinter at the time of performing the transfer according to the modified example of the present Embodiment.

FIG. 11 is a schematic view showing a cross-section of a transfer roller including a cooling fin taken along the longitudinal direction of the roller according to an embodiment where the transfer roller is held by the shaft from an upper part of the inner circumference surface of the roller.

FIG. 12 is a schematic view showing a cross-section of the cylindrical transfer roller taken along the transverse direction of the roller in the embodiment shown in FIG. 11.

FIG. 13 is a schematic view showing a method in which a pattern of a small transfer roller is transferred onto a UV-curable resin coated on a large transfer roller. The hatched portion in the figure shows a pattern-formed region.

BEST MODES FOR CARRYING OUT THE INVENTION

The present invention is mentioned in more detail below with reference to Embodiments, but not limited only thereto.

The roller imprinter (hereinafter, also referred to as an imprinter) and the method of producing an imprinted sheet with this imprinter according to the present invention are mentioned below with reference to the drawings.

Figure 1:
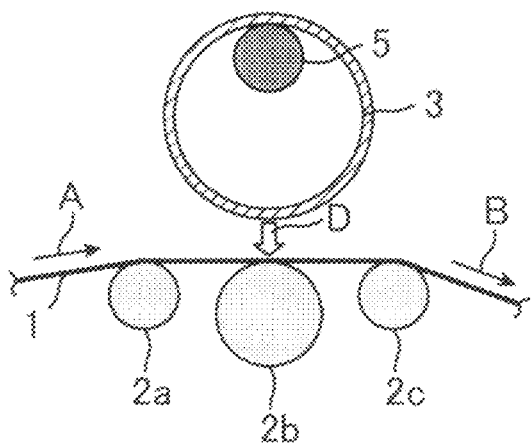
[FIG. 1]
Figure 1:
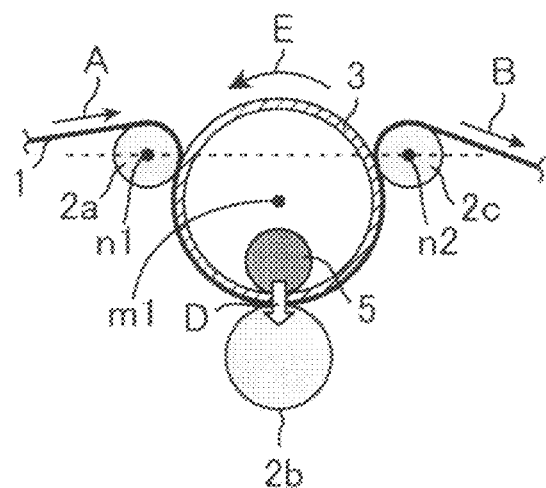

FIG. 1(a) illustrates a main part of an imprinter before performing transfer to a workpiece sheet by a transfer roller. FIG. 1(b) illustrates a main part of the imprinter at the time of performing the transfer.

The imprinter of the present Embodiment includes first to third pinch rollers 2a to 2c, a transfer roller 3, and a shaft (shaft component) 5, but not include an axis shaft whose axis is coincident with the rotation axis of the transfer roller 3, as shown in FIG. 1(b).

The first to third pinch rollers 2a to 2c are configured to hold and rotate the transfer roller 3 while pinching a workpiece sheet 1 with the transfer roller 3. At least two of the first to third pinch rollers 2a to 2c are configured to serve as a tension roller that strains the sheet to adjust its tension before the transfer.

The transfer roller 3 has a cylindrical shape. On the outer circumference surface of the roller 3, a nanometer-sized transfer pattern is formed. Unlike conventional transfer rollers, the transfer roller 3 is free of an axis shaft whose axis is coincident with the rotation axis of the roller 3, and a columnar shaft 5 is just disposed inside the roller 3 to penetrate therethrough. The shaft 5 has a columnar shape, but may have a cylindrical shape. The shaft 5 may be not necessarily a columnar or cylindrical one with a uniform diameter, and may have a portion whose diameter is different from that of the other portion as in the configuration of FIG. 9(b) mentioned below.

The shaft 5 is not integrally formed with the transfer roller 3 but just disposed inside the roller 3. Accordingly, there is no need to provide the roller 3 with an axis shaft by some mechanical processing. The transfer roller 3 and the shaft 5 are disposed so as to have different and independent axes of rotation and to be different in the center of the rotation axis. Thus in the present Embodiment, the transfer roller 3 has a simple mechanism, and this allows easy mounting/dismounting and replacement of the roller 3.

According to the present Embodiment, the tension of the workpiece sheet 1 is adjusted under the state in FIG. 1(a), prior to embossing to the sheet 1. In FIG. 1(a), the transfer roller 3 and the second pinch rollers 2b are opposite to each other with the workpiece sheet 1 therebetween, and the shaft 5 is on standby at an upper part of the inner circumference surface of the roller 3 while suspending the roller 3. When the workpiece sheet 1 is out of contact with the transfer roller 3, the first pinch roller 2a and the third pinch roller 2c apply tensions to the sheet 1 in the directions of arrows A and B, whereby the base film 1 is strained between the first and third pinch rollers 2a and 2c. In this manner, it is confirmed that the sheet 1 travels smoothly in the imprinter. Specifically, the first and third pinch rollers 2a and 2c also serve as the at least two tension rollers of the present invention.

The workpiece sheet 1 is strained before the embossing, so that the sheet 1 is not strained in the directions of arrows A and B while being scraping against the transfer roller 3. In conventional manners, a workpiece sheet is provided with a preliminary transfer treatment (so-called pre-transfer treatment) before being coated with a workpiece material (resin), thereby preventing a sheet that is being twisted from undergoing the transfer. The present Embodiment needs no this pre-transfer treatment. This pre-transfer treatment has a disadvantage in that when a foreign substance is caught between the roller 3 and the sheet 1, for example, the transfer roller 3 surface tends to be easily damaged because of the absence of the workpiece material, or buffer. This does not occur in the present Embodiment. At the time of the tension adjustment, the second pinch roller 2b may or may not rotate.

After confirming that the sheet 1 smoothly travels by the tension adjustment, the shaft 5 moves down in the direction of arrow D. When the roller 3 comes into contact with the second pinch roller 2b with the sheet 1 therebetween, the shaft 5 presses the roller 3 against the second pinch roller 2b as shown in FIG. 1(b), or alternatively, the pinch roller 2b also moves down when contacting the roller 3, and then the transfer roller 3 moves down together with the second pinch roller 2b.

Thus the sheet 1 is pinched between the shaft 5 and the second pinch roller 2b, and on the other hand, the pinch rollers 2a and 2c move to rotate the transfer roller 3, and thereby the roller 3 is supported at the three points by the first to third pinch rollers 2a to 2c. In this case, it is preferable that the positions of the axis of rotation n1 of the first pinch roller 2a and the axis of rotation n2 of the third pinch roller 2c are horizontally higher than that of the axis of rotation m1 of the transfer roller 3. The first pinch roller 2a and the third pinch roller 2c are positioned to hold the transfer roller 3, and push the roller 3 against one another. Thus, the transfer roller 3 can be more surely held.

The positions of the axes of rotation n1 and n2 of the first and third pinch rollers 2a and 2c are not necessarily horizontally higher than that of the axis of rotation m1 of the transfer roller 3. In such a case, the shaft 5 applies a pressure needed for the transfer.

The first to third pinch rollers 2a to 2c rotate the transfer roller 3 toward the direction of arrow E while holding the roller 3, thereby pushing the sheet 1 forward or back. While the surface of the sheet 1 is pressed uniformly by the first to third pinch rollers 2a to 2c and the transfer roller 3, a protrusion-recess pattern on the transfer roller 3 surface can be transferred onto the sheet 1. The above-mentioned method allows a uniform pressure application to the sheet 1, so that the sheet 1 after the transfer has a uniform thickness.

As mentioned above, according to the present Embodiment, the transfer process is not initiated until it is confirmed that the sheet 1 smoothly travels with being strained between the first pinch roller 2a and the third pinch roller 2c. This can prevent the transfer roller 3 from being damaged by the workpiece sheet 1 or a foreign substance that is caught between the sheet 1 and the roller 3.

In UV imprint, a UV-curable resin can be easily coated before the roller 3 is brought into contact with the sheet 1. This resin coating serves as a buffer to prevent direct contact between the roller 3 and the sheet 1. As a result, the damage on the transfer surface of the roller 3 can be more surely prevented.

The transfer surface of the roller 3 is less likely to be damaged, so that transfer defects of the sheet 1, which are caused by the damages, and an accompanying reduction in yield can be prevented. Adhesion of the resin to the roller 3, and an accompanying transfer defect or yield reduction can be also prevented. Further, an increase in cost attributed to life shortening of the transfer roller 3, which is due to the damages on the transfer roller 3, can be prevented.

The following will mention specific examples of the imprinter and the production method of the printed sheet of the present Embodiment with reference to FIGS. 2 to 7. Those specific examples relate to UV imprint involving use of a UV-curable resin.

Figure 2:
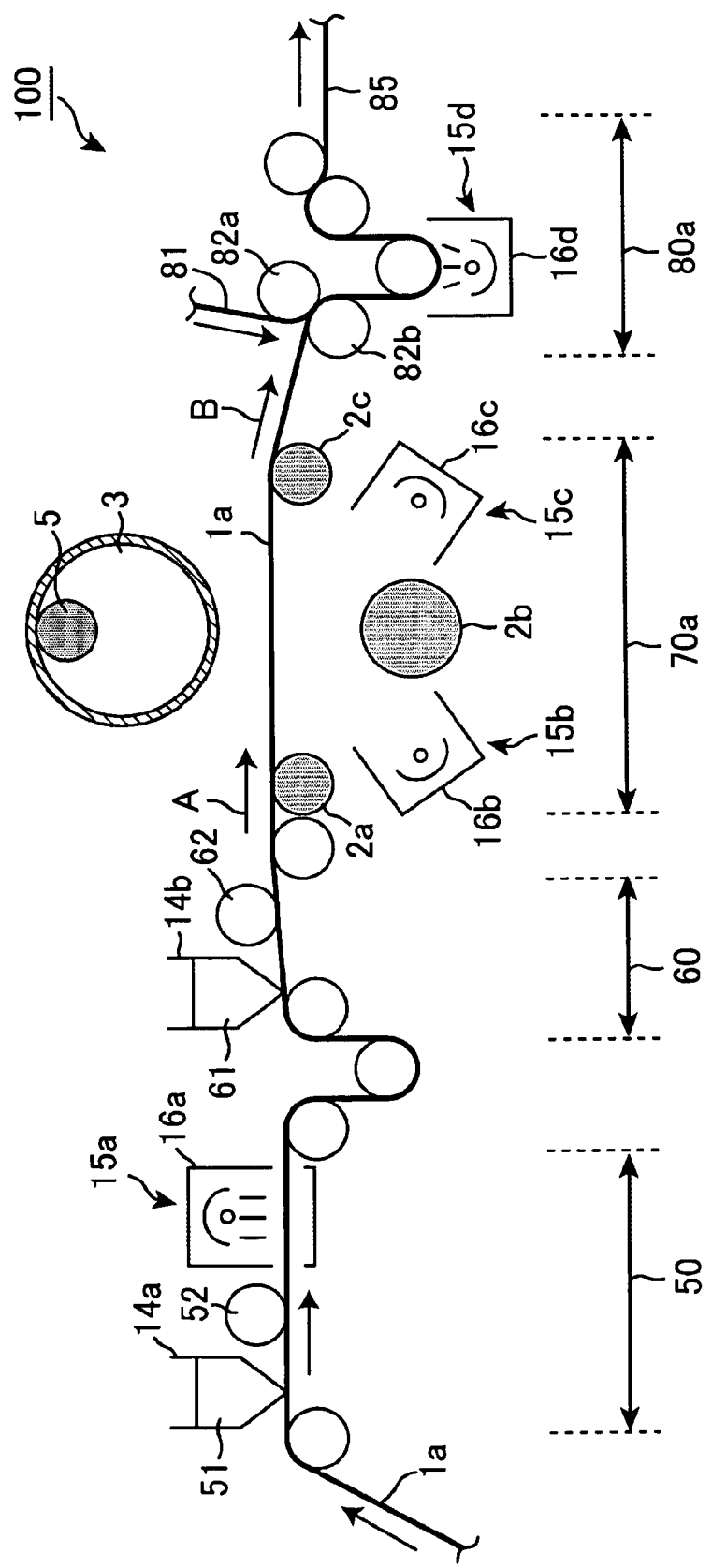
[FIG. 2]

FIG. 2 is a schematic view showing an imprinter at the time of performing the tension adjustment for a workpiece sheet. In FIG. 2, a roll of a base film 1a is first set on a supply roller (not shown) in an imprinter 100. A TAC film is used as the base film 1a. The base film 1a is designed to have a width smaller than that of each of the transfer roller 3 and the first to third pinch rollers 2a to 2c so as to be uniformly nipped by these rollers. After fed from the supply roller, the base film 1a is strained in the directions of arrows A and B, whereby the tension of the film 1a is adjusted so that the film 1a smoothly travels in the imprinter.

After the tension adjustment, the base film 1a advances to a primer-coating step 50 where the base film 1a is to be coated with a primer (pre-treatment agent) for improving adhesion between the film 1a and a workpiece resin. In the primer-coating step 50, a coater 14a injects a primer 51 from its nozzle, and thereby the film 1a is coated with the primer 51. The primer 51 enters between the base film 1a and the workpiece resin to bond them to each other, thereby enhancing the adhesion therebetween. In this Embodiment, the base film 1a is a TAC film, and the workpiece resin is an acrylic UV-curable resin as mentioned above, and therefore, an acrylic silane coupling agent, which has good compatibility with these materials, is used.

Next, the primer 51 coating on the base film 1a is leveled with a roller 52 and then irradiated with UV light by a UV irradiator 15a to be cured. This adjustment of the film thickness by the roller 52 may not be performed, for example, when the primer 51 coating can be formed on the film 1a to have a uniform thickness and width using a slit coater and the like.

The primer 51 does not necessarily coated when the workpiece resin easily bonds to the base film 1a. For example, the primer 51 does not need to be coated when a PET film is used as the base film 1a. Accordingly, whether or not the primer-coating step 50 is carried out is appropriately determined according to characteristics of the base film 1a and the workpiece resin. Further, in this Embodiment, the acrylic silane coupling agent is used as the primer 51, and the UV irradiator 15a is used for curing the primer 51. However, the primer 51 may be cured by heat such as infrared light although depending on the kind of the primer 51.

Next, in a workpiece resin-coating step 60, a coater 14b injects a workpiece resin 61 from its nozzle, and thereby the resin 61 is coated on the cured primer 51. An acrylic UV-curable resin is used as the workpiece resin 61. The applied workpiece resin 61 is adjusted for its thickness with a roller 62 to have a uniform thickness. Also in the workpiece resin-coating step 60, as in the step 50, the roller 62 may not necessarily be used when the resin 61 coating can be formed on the base film 1a to have a uniform thickness and width with a slit coater and the like.

The base film 1a including the resin 61 formed thereon advances to a transfer step 70a. In the transfer step 70a, as in FIG. 1(a), the transfer roller 3 is secured above the base film 1a to be away therefrom so that the surface of the transfer roller 3 is protected against damages possibly caused by the pre-transfer treatment.

The material for the roller 3 is not especially limited. In this example, an aluminum mold roller is used on the assumption that a moth-eye structure would be formed. Such a mold roller can be prepared by cut-polishing a cylindrical aluminum tube formed by extruding, and alternately repeating several times anodization and etching for the cut-polished flat surface of the aluminum tube. The thus-prepared mold roller has a seamless nanostructure because the anodization and etching are simultaneously performed for the outer circumference surface of the cylindrical aluminum tube. Thus the seamless nanostructure can be continuously transferred onto the base film 1a.

The thus-prepared transfer roller 3 has a cylindrical shape, and on its outer circumference surface, the transfer pattern in a nonometer size is formed. This Embodiment employs a cylindrical member with 250 mm in inner diameter, 260 mm in outer diameter, and 400 mm in length and having an outer circumference surface with a plurality of conical cavities formed thereon. The conical cavities each have a depth of about 200 nm (the top of the cone is positioned on the aluminum base layer side).

Figure 3:
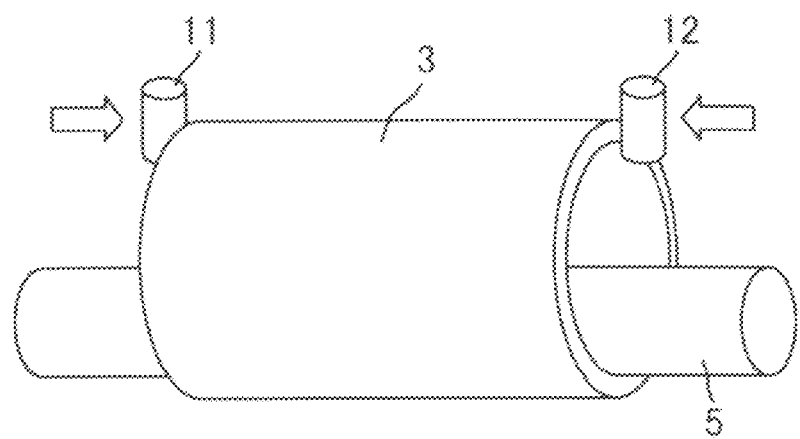
[FIG. 3]

The transfer roller 3 may be equipped with bearings 11 and 12 for positioning the direction of the rotation axis of the transfer roller 3 (the width direction of the base film 1a). FIG. 3 is a perspective view showing a state where the shaft 5 is disposed inside the transfer roller 3 equipped with the bearings 11 and 12. Each of the bearings 11 and 12 is secured at an upper portion of the edge surface of the transfer roller 3 and is pressed in the arrow direction in FIG. 3. The bearings 11 and 12 are disposed for the purpose of keeping the axis directions of the first to third rollers 2a to 2c and the transfer roller 3 substantially parallel to one another. The bearings 11 and 12 are configured to keep the position of the transfer roller 3 at the time of the transfer. The bearings 11 and 12 are located at the upper portion of the transfer roller 3, and therefore interfere with the shaft 5 in the state shown in FIG. 1(a). However, this does not cause any problem because the bearings 11 and 12 are free of a driving axis and the like and this allows easily changing the position of the bearings 11 and 12 appropriately.

The first to third pinch rollers 2a to 2c are configured that the first pinch roller 2a and the third pinch roller 2c can apply to the base film 1a a proper tension for the smooth traveling and that at least one of the first to third pinch rollers 2a to 2c can serve as a driving source for pushing the base film 1a forward. Although the first and third pinch rollers 2a and 2c are the same in size, the second pinch roller 2b is larger than the other two rollers 2a and 2c because it is pressed by the transfer roller 3 at the time of the transfer. Robber rollers are used as the first to third pinch rollers 2a to 2c so as to sufficiently adhere to the transfer roller 3 when pressing the roller 3.

A UV irradiator 15b is disposed between the first and second pinch rollers 2a and 2b, and a UV irradiator 15c between the second and third pinch rollers 2b and 2c. The UV irradiators 15b and 15c are not turned on until it is confirmed that the base film 1a travels smoothly with the UV-curable resin formed on the film 1a being in contact with the transfer roller 3.

The reason of this is as follows: In the curing of the primer 51, the primer 51 needs to be cured before the workpiece resin 61 is coated on the base film 1a because the primer 51 is used for enhancing the adhesion therebetween. However, in the process where the transfer roller 3 moves down to contact with the base film 1a, the workpiece resin 61 serves as a buffer for preventing the transfer roller 3 and the base film 1a from directly contacting with each other with a foreign substance being therebetween, and therefore, the resin 61 has to be in an uncured state.

The base film 1a including the uncured workpiece resin 61 coated thereon advances to a next protection film-attaching step 80a. In the step 80a, a protective film 81 is fed from a direction different from that of the base film 1a. By passing through a nip between the pair of rollers 82a and 82b, the base film 1a and the protective film 81 are attached to each other to yield a laminated film 85.

When the workpiece resin 61 is still in an uncured state in a subsequent step, the resin possibly adheres to a roller in the subsequent step. Further, this roller might catch dusts on its surface, and the dusts might re-adhere to an imprinted sheet, which is an end product. This possibly leads to a reduction in yield. Accordingly, it is preferable that the workpiece resin 61 is cured. It is suitable that the workpiece resin 61 is cured after being laminated on the protective film 81. The reason of this is as follows: When the workpiece resin 61 is an anaerobic one, the workpiece resin 61 lying between the base film 1a and the protective film 81 is not exposed to air. Therefore, the resin 61 can be easily cured by UV light radiation.

In this Embodiment, the UV irradiator 15d radiates UV light to the laminated film 85 just having passed through the nip between the pair of rollers 82a and 82b, thereby curing the resin 61. The laminated film 85 including the cured resin 61 is wounded by a roller (not shown).

Figure 4:
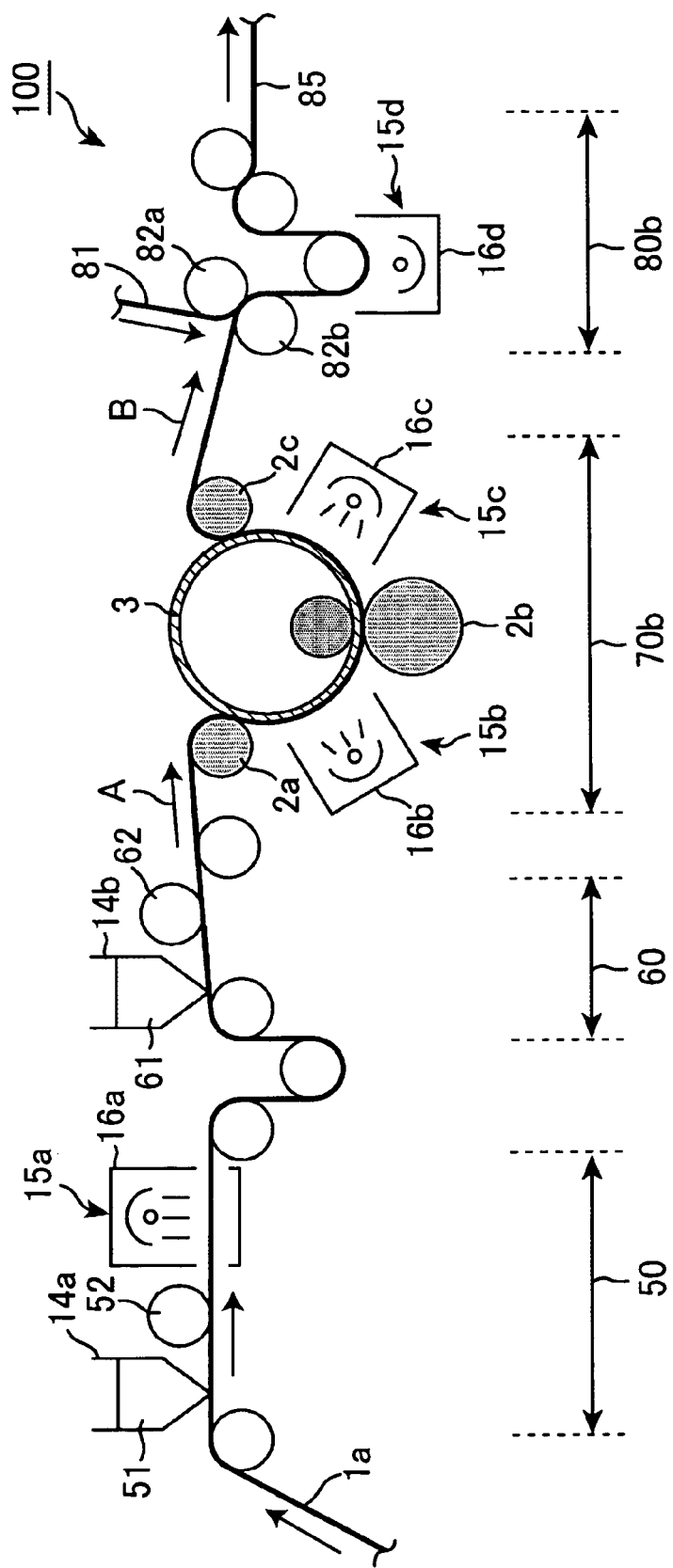
[FIG. 4]
Figure 5:
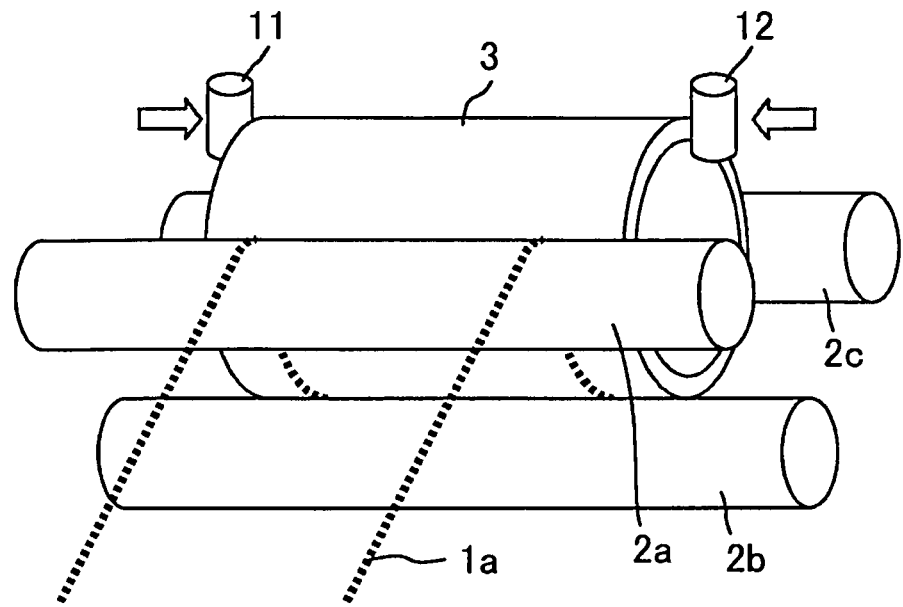
[FIG. 5]

After the tension adjustment for the base film 1a, the transfer of the nanostructures is performed. FIG. 4 is a schematic view showing the imprinter at the time of performing the transfer onto the workpiece sheet. In FIG. 4, the steps 50 and 60 are the same as in FIG. 2, and the explanation thereof is omitted. In a transfer step 70b, the transfer roller 3 moves down like in FIG. 1(b) to press the base film 1a. FIG. 5 is a perspective view showing the state of FIG. 1(b). In FIG. 5, the base film 1a is shown by the broken line, and the shaft 5 is not illustrated.

As illustrated in FIGS. 1(b), 4, and 5, the transfer roller 3 is in contact with the first and third pinch rollers 2a and 2c in addition to the second pinch roller 2b to be supported by the three pinch rollers at the time of the transfer. The positions of axes of rotation n1 and n2 of the respective first and third pinch rollers 2a and 2c are horizontally higher than that of the axis of rotation m1 of the transfer roller 3. As a result, the first pinch roller 2a and the third pinch roller 2c are located to hold the transfer roller 3, and push the roller 3 against one another. Thus, the transfer roller 3 can be more surely held. This can obviate the need of the pressurization by the shaft 5 or can decrease a pressure applied by the shaft 5.

When the shaft 5 does not apply a pressure to the transfer roller 3 at the time of the transfer, the shaft 5 just moves up and down the transfer roller 3. Therefore, the shaft 5 does not have to have a strength enough to endure a load at the time of the pressurization, and therefore, the shaft 5 can be formed to have a thin profile. This leads to an increase in space inside the transfer roller 3, and therefore it becomes easier to dispose the cooling mechanism on the inner circumference side of the transfer roller 3. The cooling mechanism is provided depending on the material for the roller 3 and the like. For example, when a nozzle for supplying a cooling fluid is provided as the cooling mechanism, a nozzle with a larger diameter can be disposed to increase the cooling efficiency.

While moving along the outer circumference surface of the roller 3 between the first to third rollers 2a to 2c, the base film 1a is exposed to UV light irradiated by UV irradiators 15b and 15c from below the transfer roller 3. As a result, the workpiece resin 61 of a UV-curable resin is cured with the nanometer-sized protrusions and recesses in the inverse shape of the pattern on the roller 3 surface, i.e., a moth-eye structure, formed thereon.

When the axis of rotation n1 of the first pinch roller 2a and the axis of rotation n2 of the third pinch rollers 2c are positioned horizontally higher than the axis of rotation m1 of the transfer roller 3, distances between the first pinch roller 2a and the second pinch roller 2b and between the second pinch roller 2b and the third pinch roller 2c can be increased. Therefore, a broader region irradiated by the UV irradiators 15b and 15c can be secured. In this case, under a given transfer rotation speed of the transfer roller 3 (moving speed of the base film 1a), the distance where the workpiece resin 61 travels with being exposed to UV light is increased and as a result, the irradiation dose is also increased. Accordingly, as compared to the case where the region to be irradiated with UV light is not increased, the transfer rotation speed of the transfer roller 3 can be higher, and as a result, the productivity can be increased.

After passing through the third pinch roller 2c, the base film 1a including the cured workpiece resin 61 formed thereon moves away from the transfer roller 3, and then a protective film 81 is attached to the resin 61 to yield a laminated film 85. The protective film 81 includes a cohesive previously formed on its surface to be attached to the base film 1a. The base film 1a and the protective film 81 are attached to each other at a nip pressure between the rollers 82a and 82b, the pressure being low enough to avoid deformation of the transferred moth-eye structure. The protective film 81 protects the moth-eye structure-having resin film surface against a foreign substance such as a dust or against scratch. The protective film 81 is disposed just for the purpose of protecting the moth-eye structure until the base film 1a is attached to a surface of a polarizer, a display, and the like, and therefore after the attachment, the protective film 81 is to be removed from the film 1a.

The workpiece resin 61 has been already cured by UV light irradiated by the UV irradiators 15b and 15c, so that the UV irradiator 15d is turned off in a protective film-attaching step 80b. The UV irradiators 15a to 15d are surrounded by enclosures 16a to 16d, respectively, whereby UV light leakage to the outside of the irradiator is prevented.

Figure 6:
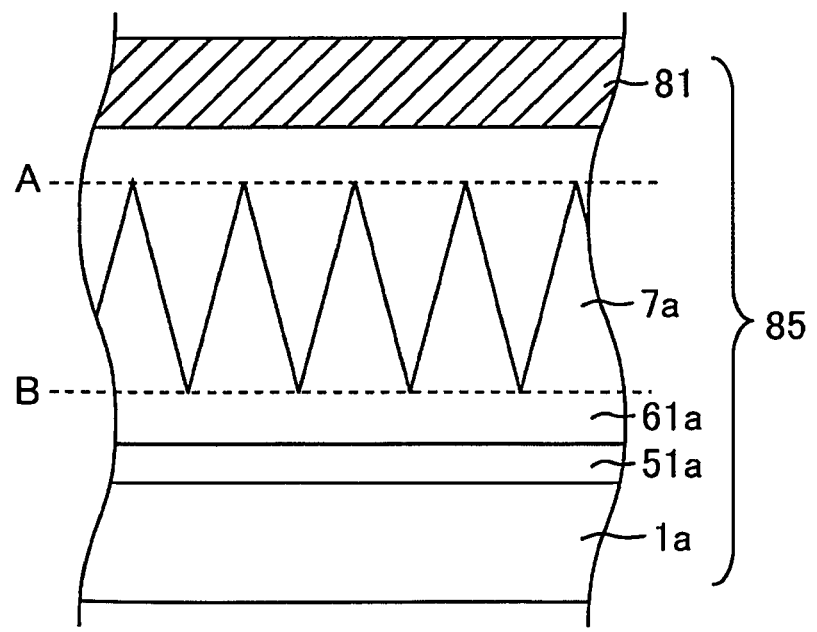
[FIG. 6]
Figure 7:
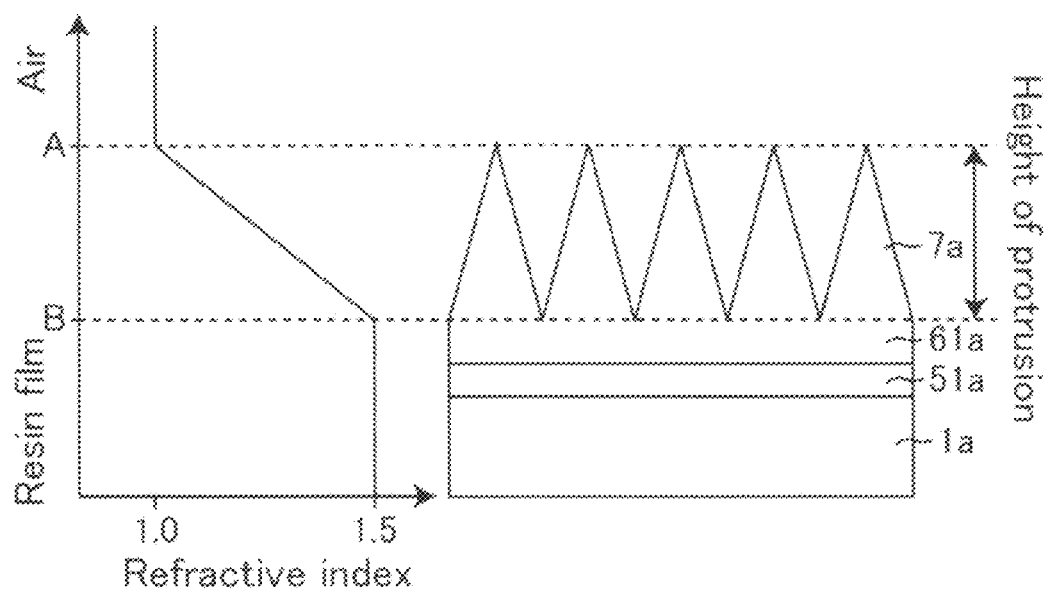
[FIG. 7]

The laminated film 85 is wounded to yield a roll of the laminated film. FIG. 6 is a cross-sectional view schematically showing a configuration of the laminated film 85. As illustrated in FIG. 6, the laminated film 85 includes the base film 1a, the primer layer 51a, the resin film 61a having the nanostructure 7a formed thereon, and the protective film 81.

The nanostructure 7a has a surface structure composed of a large number of substantially conical protrusions. The height of the protrusions is about 200 nm, and the distance between tops of adjacent ones of the protrusions is also about 200 nm. Such a surface structure is often called "moth-eye structure". Films (sheets) having a surface with a moth-eye structure formed thereon are known as an ultra-low reflective film (sheet). When the base film 1a has a refractive index of 1.5, for example, the interface reflectivity of visible light between air (n=1.0) and the base film 1a is 4.0% in the absence of the moth-eye structure, but in the presence of the resin film 61a including a moth-eye structure and having a refractive index of 1.5 at the interface, the interface reflectivity can be decreased to about 0.2%. Specifically, the protrusion of the nanostructure 7a is much smaller than the visible light wavelength (380 to 780 nm), so that visible light regards that the refractive index continuously changes from 1.0 to 1.5 between the top of the protrusion on the surface side (A side in FIG. 6) to the bottom thereof (B side in FIG. 6).

FIG. 7(a) is a schematic view for explaining refractive index change on the interface between air and the resin film. FIG. 7(b) is a cross-sectional view schematically showing a configuration of the laminated film. FIG. 7(b) shows an embodiment based on the assumption that the laminated film 85 is free of the protective film 81 (including the cohesive layer). In FIG. 7(a), air on the top side (the A side) has a refractive index of 1.0, and the resin film (the B side) of 1.5. The refractive index continuously and gradually increases from the top to the bottom (the A to B side) of the protrusion because of the presence of the nanostructure 7a. In this case, substantially no interface where the refractive index is discontinuously changed exists, so that the reflectivity at the structure-formed surface can be extremely decreased.

No reflection occurs at the interface between the resin 61a and the base film 1a, each of which has a refractive index of 1.5. When a film with the nanostructure 7a is attached to a glass plate with a refractive index of 1.5, the refractive index is not changed at the film/glass interface, so that the air/film interface where the refractive index is largely changed is just taken into consideration. In this case, the presence of the nanostructure 7a can reduce the reflectivity at the air/film interface.

The laminated film 85 was measured for thickness, which determined that the resin film 61a has a thickness of 10±0.7 µm and is excellent in thickness uniformity. The prepared laminated film 85 was attached to a flat and smooth surface of a black acrylic plate (refractive index of 1.49) with a paste (refractive index of 1.50), and then, the protective film 81 was removed. Then, this was observed by eye under illumination of a white light source from various viewing angles. Neither uneven surface reflection nor accompanying uneven display quality were observed. When visible light at 380 to 780 nm was made incident at an angle of 5° with respect to the normal direction to an incident surface to be measured for reflectivity, the direct reflectivity of visible light at 550 nm was 0.15%, and the average reflectivity of visible light at 380 to 780 nm was 0.2%.

The laminated film 85 is suitably attached, as an anti-reflection sheet, to display screens of display devices, display windows such as a show window, or decorated surfaces of building materials. Examples of the display devices include LCDs, organic EL displays, and plasma displays.

The present Embodiment refers to the case where the workpiece resin 61 is coated on the base film 1a, but a resin may be coated on the transfer roller 3.

The locations of the first to third pinch rollers 2a to 2c is not especially limited although in the present Embodiment the first to third pinch rollers 2a to 2c are disposed to be spaced at 120° and to be substantially symmetrical with respect to the rotation center of the transfer roller 3 at the time of the transfer. Preferably, the transfer roller 3 can be held by only the first to third pinch rollers 2a to 2c. The number of the pinch rollers is not especially limited.

Although in the present Embodiment the first and third pinch rollers 2a and 2c serve also as the tension roller, the number of such rollers is not especially limited.

In the present Embodiment, the UV irradiator 15b is disposed between the first pinch roller 2a and the third pinch roller 2c, and the UV irradiator 15c between the second pinch roller 2b and the third pinch roller 2c. However, one or three or more UV irradiators may be disposed, and the location thereof can be also appropriately determined.

Figure 8:
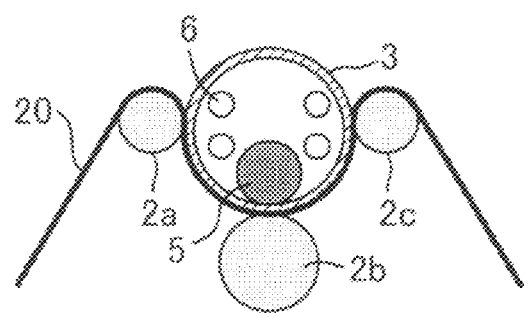
[FIG. 8]

Although the present Embodiment employs UV imprint involving use of a UV-curable resin as the workpiece resin 61, thermal imprint involving use of a thermoplastic resin may be employed. FIG. 8 is a cross-sectional view showing a main part of an imprinter when a sheet 20 of a thermoplastic resin is used as the workpiece sheet. According to conventional thermal imprint, the base film 1a directly contacts with the transfer roller 3 at the time of the transfer but does not graze each other. Even if a foreign substance exists between the film 1a and the roller 3, this causes no problems because in the thermal imprint, the foreign substance is buried in the sheet 20 that is in a softened state. One problem the conventional thermal imprint has is that in the tension adjustment for the sheet 20, the transfer roller 3 is highly likely to be damaged by grazing the sheet 20 or catching a foreign substance with the sheet 20. Thus when the tension adjustment of the present Embodiment of FIGS. 1(a) and 1(b) is employed in thermal imprint, damages on the transfer roller 3 possibly caused in the process of producing imprinted sheets can be suppressed as much as possible, even in the absence of such a buffer as the workpiece resin 61.

The heating mechanism in thermal imprint may be mounted on the inside of the respective axes of the first to third rollers 2a to 2c or on the inside of a pressure roller 5. For example, as shown in FIG. 8, IR heaters 6 may be mounted inside the transfer roller 3. In FIG. 8, four IR heaters are mounted but the number thereof is not especially limited.

The present Embodiment refers to the imprinter that performs a series of processes from feeding to take-up of the base film 1a. However, the imprinter is not especially limited as long as it has an embossing mechanism.

In the present Embodiment, the transfer roller 3 is a metal tube of aluminum but may be a glass or ceramic tube, and the material thereof is not especially limited.

In the present Embodiment, the shaft 5 is just disposed inside the cylindrical transfer roller 3, and there is no need to provide any process for the transfer roller 3 itself. Therefore, a non-metallic transfer roller is applicable to the roller 3. Conventionally, glass or ceramic tubes have not been used because generally it is not easy to provide these tubes with mechanical processings, involving cutting, drilling, and screw-cutting, and therefore it is difficult to prepare a transfer roller including an axis shaft that is integrally formed therewith and through which the transfer roller is mounted on an imprinter, by processing these tubes. Particularly tubes with a high hardness like a ceramic one are difficult to machine.

Use of a glass tube as the transfer roller obviates the need of the surface polishing because the glass tube has a smooth surface unlike the metal roller of aluminum and the like. Further, an aluminum film is formed on the outer circumference surface of the glass tube, and successively, by anodization, conical cavities in a nanometer size can be formed thereon.

A ceramic tube can be suitably used as the transfer roller when the production method involves a high temperature step at the time of transfer or a widely varying temperature step, e.g., a step involving thermal imprinting followed by cooling because ceramic materials are superior to metals in heat resistance, size retention under high temperatures, and heat-dissipating performance.

When a glass or ceramic tube is used, preferably used is a method of preparing a transfer roller by forming a pattern on a metal thin film on the tube surface. According to one preferable embodiment of the transfer roller, for example, an aluminum thin film is formed on the outer surface of a glass or ceramic cylinder, and nanometer-sized cavities are provided on this aluminum thin film by anodization. In this case, a transfer roller having a substantially seamless surface can be produced. Further, in such a roller including a glass or ceramic base, the base is not corroded by the anodization or etching, so that no masking for corrosion prevention is needed.

Figure 9:
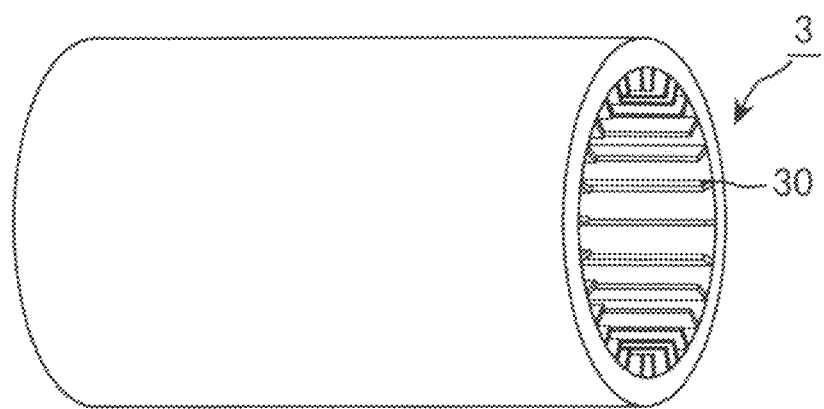
[FIG. 9]
Figure 9:
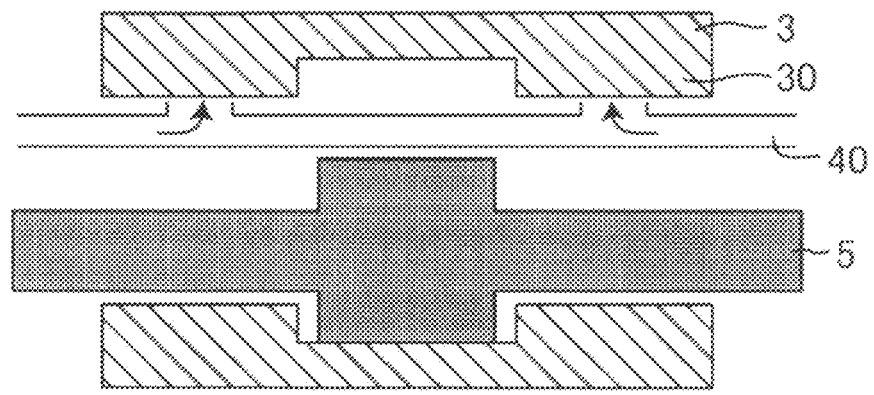

In the present Embodiment, as shown in FIGS. 9(a) and 9(b), a cooling mechanism may be disposed on the inner circumference surface of the transfer roller 3. According to UV imprint involving use of a UV-curable resin, heat generated due to UV radiation increases the temperature of the transfer roller, and this possibly causes spontaneous curing of a UV-curable resin or film expansion. According to one way of preventing generation of these disadvantages, a cooling mechanism is disposed on the inner circumference surface of the transfer roller 3 to keep the temperature rise within a certain range.

FIG. 9(a) is a perspective view of the transfer roller 3 including a cooling fin. FIG. 9(b) is a cross-sectional view for explaining a way of cooling the transfer roller 3 by the cooling fin. The configuration of the cooling mechanism is not especially limited. In FIG. 9(a), the cooling fin is integrally formed on the inner circumference surface of the transfer roller 3.

When the transfer roller 3 is a metal or ceramic one, a cooling fin 30 can be integrally formed inside the roller 3. When an aluminum tube is produced by drawing process, for example, the cooling fin 30 can be formed into a shape in accordance with a shape of a mold used for the drawing. When the transfer roller 30 is a ceramic one, the cooling fin 30 can be formed into a shape in accordance with a shape before sinter.

The cooling fin 30 is formed on the inner circumference surface of the transfer roller 3, and further provided with a duct 40 for supplying air as a cooling fluid to the fin 30, whereby the cooling efficiency can be improved.

The transfer roller 3 has a region free of the cooling fin 30 on part of the inner wall thereof. For example, the fin can be partly removed by polishing when a metal transfer roller is used. When a ceramic transfer roller is used, a part free from the fin 30 can be previously formed.

According to the embodiment shown in FIG. 9(b), part of the shaft 5 disposed inside the roller 3 has an outer diameter larger than that of the other part, and this part contacts with the fin 30-free portion to press the roller 3 against the direction of arrow A. The other part, which has a smaller outer diameter, of the shaft 5 is disposed to cross over the fin 30 and does not in contact with the roller 3.

The duct 40 is provided on part of the fin 30 and forces air to blow against the fin 30. The duct 40 is configured to supply air pressure-fed from the outside directly for the fin 30 through an opening (hole) of the duct 40. Thus the transfer roller 3 is cooled. When the transfer roller 3 is a glass one, it is difficult to integrally form the cooling fin 30 inside the roller 3. However, a cylindrical fin prepared by providing an aluminum thin plate with bending can be disposed inside the roller 3. In this case, a wide space can be secured inside the roller 3, so that the diameter of the duct 40 can be increased, and as a result, the cooling efficiency also can be improved. The shape, number, and the like of the cooling fin disposed in the transfer roller are not especially limited.

Figure 10:
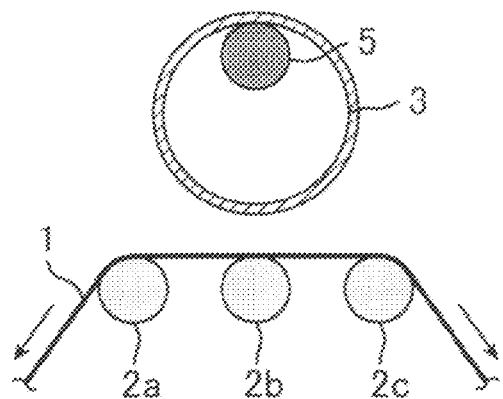
[FIG. 10]
Figure 10:
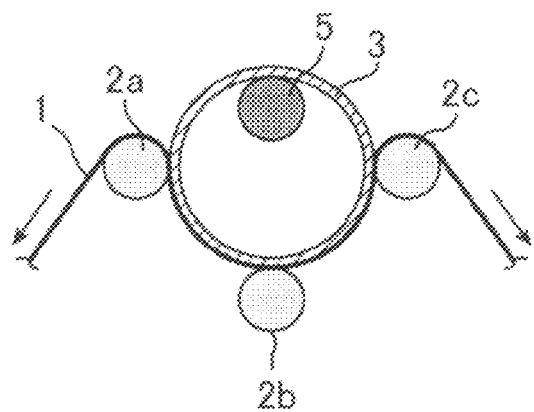

Although in the present Embodiment the second pinch roller 2b is larger than each of the first and third pinch rollers 2a and 2c, the size of the first to third pinch rollers is not especially limited. The second pinch roller 2b may be smaller than each of the first and third pinch rollers 2a and 2c, or the first to third pinch rollers 2a to 2c have the same size. FIG. 10(a) is a schematic view showing a main part of an imprinter including first to third pinch rollers having the same size at the time of performing the tension adjustment.

The present Embodiment include the above-mentioned two cases: the shaft 5 presses the transfer roller 3 downward at the time of the transfer; and the shaft 5 does not press the transfer roller 3 at the time of the transfer. The former case is adapted when a sufficient embossing pressure can not be provided only by the weight of the transfer roller 3. The latter case is adapted when a just proper embossing pressure can be provided by the weight of the roller 3, or when the transfer roller has a large weight because of its large diameter or length, and therefore the embossing pressure by the weight of the roller 3 is desired to be decreased.

For example, when an aluminum tube with 1 m in length, 300 mm in outer diameter, 260 mm in inner diameter is used as the transfer roller 3, the roller 3 has a weight of about 47.5 kg. On the assumption that a portion where the base film 1a is pinched by a nip pressure between the transfer roller 3 and the second pinch roller 2b has a width of 2 mm, the embossing pressure attributed to only the weight of the transfer roller 3 is about 0.23 MPa in the transfer. When a UV-curable resin is used, a proper embossing pressure is estimated to be 0.2 to 0.5 MPa, generally, and so the embossing pressure of about 0.23 MPa causes no any problem. However, an actual embossing pressure might become beyond the proper range depending on the weight of the transfer roller 3 or the width of the pressurization portion, even if the transfer roller 3 is just put on the second pinch roller 2b without being pressed by the shaft 5.

When the embossing pressure is too large, the resin after the embossing has a too small thickness, or the resin is stretched too much to extend out of the side surface of the roller 3, and as a result, the protrusion-recess pattern on the surface of the roller 3 might be deformed.

According to one embodiment of decreasing the embossing pressure, for example, the shaft 5 can be moved toward such a direction as to lift the transfer roller 3 at the time of the transfer. FIG. 10(b) is a schematic view showing the main part of the imprinter of FIG. 10(a) at the time of performing the transfer and showing an embodiment where the transfer roller is held upward by the shaft from an upper part of the inner circumference surface of the roller at the time of performing the transfer. When the tension of the base film 1a is adjusted by the first pinch roller 2a and the third pinch roller 2c, as shown in FIG. 10(a), the cylindrical transfer roller 3 is suspended by the shaft 5 disposed thereinside to be held above the second pinch roller 2b. The shaft 5 moves down to cause the transfer roller 3 to push down the second pinch roller 2b together with the base film 1a. Thus, the imprinter becomes ready for the transfer. In the above-mentioned state, in FIG. 1(b), the shaft 5 moves from an upper end to a lower end of the inner circumference surface of the roller 3 to pinch the base film 1a with the second pinch roller 2b, but in FIG. 10(b), in the above-mentioned state, the shaft 5 remains at the upper end of the circumference surface of the transfer roller 3 as it did before the downward movement. By increasing or decreasing a ratio of the weight of the transfer roller 3 supported by the shaft 5, a ratio of the weight of the transfer roller 3 supported by the pinch roller 2b is increased or decreased. Thus, the embossing pressure is adjusted.

Figure 11:
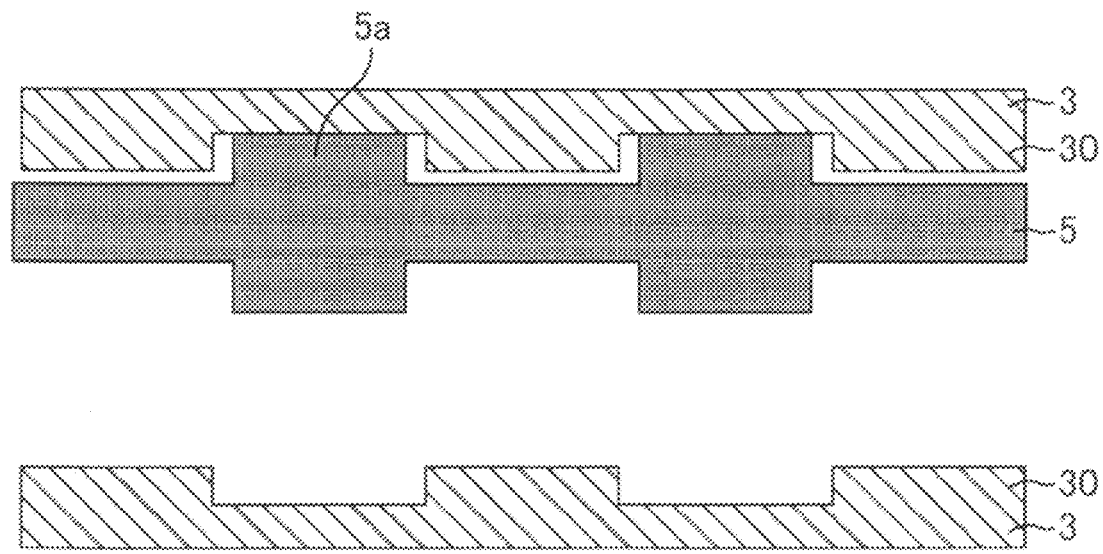
[FIG. 11]
Figure 12:
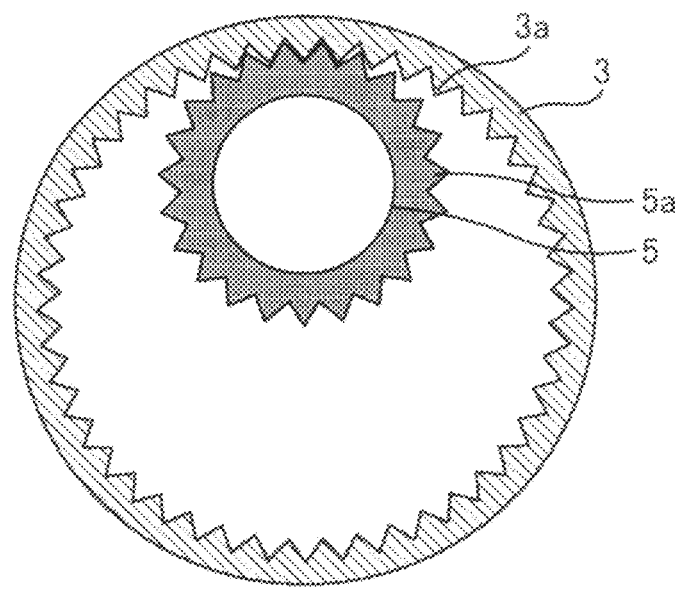
[FIG. 12]
Figure 13:
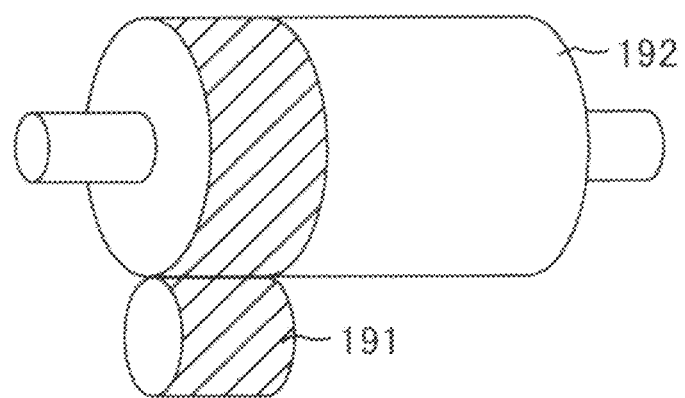
[FIG. 13]

Also in the embodiment where the transfer roller 3 is held by the shaft 5 from an upper part of the inner circumference surface of the roller 3 at the time of performing the transfer, a cooling mechanism can be provided on the transfer roller 3, similarly to the embodiment where the shaft 5 presses a lower portion of the inner circumference surface of the transfer roller 3 at the time of the transfer. The cooling mechanism can be appropriately designed not to interfere with the shaft 5. FIG. 11 is a schematic view showing a cross-section of a transfer roller including a cooling fin taken along the longitudinal direction of the transfer roller according to an embodiment where the transfer roller is held by a shaft from an upper part of the inner circumference surface of the roller. FIG. 12 is a schematic view showing a cross-section of the cylindrical transfer roller taken along the transverse direction of the roller in the embodiment shown in FIG. 11. As shown in FIG. 12, a plurality of gear parts 5a are spaced one another along the longitudinal direction of the shaft 5, and gear parts 3a that engage with the gear parts 5a are also disposed on the inner circumference surface of the transfer roller 3. By engaging contact parts of the transfer roller 3 and the shaft 5 with each other, the rotation of the roller 3 can be surely made coincident with that of the shaft 5.

Comparative Embodiment 1

The imprinter of Comparative Embodiment 1 includes an axis shaft whose axis is coincident with the rotation axis of a transfer roller. The imprinter includes the axis shaft, so that the shaft 5 is not disposed. The imprinter of Comparative Embodiment 1 has the same structure as in the imprinter 100 of the present invention except for the way of holding the transfer roller 3.

In the present Comparative Embodiment, the axis shaft has the following configuration. Specifically, a columnar metal roller with an axis shaft integrally formed therewith is used, and this columnar metal roller is disposed inside a cylindrical transfer roller. A spacer is disposed in a space between the metal roller and the transfer roller so as to make the axes of rotation of the two rollers coincident with each other. Then, into this space, a curable resin is injected to be cured, thereby bonding the two rollers to each other. Thus, the axis of rotation of the metal roller is coincident with that of the transfer roller. The transfer roller integrated with the metal roller is mounted inside the imprinter, and then a moth-eye structure is provided on the transfer roller.

The thickness distribution of a resulting resin sheet is $12\pm1.8$ μm. The prepared resin sheet was attached to a flat and smooth surface of a black acrylic plate (refractive index of 1.49) with a paste (refractive index of 1.50). Then, this was observed by eye under illumination of a white light source from various viewing angles, and an interference color caused by the uneven thickness was observed. Further, pattern defects of the transfer roller, which would be attributed to damages caused when the transfer roller integrated with the metal roller was mounted or when the adjustment for the workpiece sheet was performed, were directly transferred onto the sheet. As a result, the defect portions had a reflectivity higher than that of the other portion, so that the portions could be recognized by eye as a defect.

The present application claims priority to Patent Application No. 2008-321349 filed in Japan on Dec. 17, 2008 under the Paris Convention and provisions of national law in a designated State, the entire contents of which are hereby incorporated by reference.

EXPLANATION OF NUMERALS AND SYMBOLS

1: Workpiece sheet
1a: Base film
2a to 2c: First to third pinch rollers
3: Transfer roller
5: Shaft
6: IR heater
7a: Nanostructure
n1, n2, m1: Axis of rotation
11, 12: Bearing
14a, 14b: Coater
15a to 15d: UV irradiator
16a to 16d: Enclosure
20: Sheet
30: Cooling fin
40: Duct
50: Primer-coating step 51: Primer
52, 60: Roller
60: Workpiece resin-coating step
61: Workpiece resin
61a: Resin film
70a, 70b: Transfer step
80a, 80b: Protective film-attaching step
81: Protective film
82a, 82b: Roller
85: Laminated film
100: Imprinter
191: Small transfer roller
192: Large transfer roller

The invention claimed is:

1. A roller imprinter for transferring a pattern on a surface of a transfer roller to a surface of a workpiece sheet through rotation of the transfer roller, comprising:
a vertically movable transfer roller;
a shaft disposed within the transfer roller and outside of the axial center of the transfer roller, and
at least two tension rollers, wherein
the sheet is made strained between the at least two tension rollers while the transfer roller is suspended above the sheet by the shaft, and the transfer roller is brought into contact with the sheet by movement of the shaft,
the shaft includes a plurality of first gear parts which are spaced one another along a longitudinal direction of the shaft,
the transfer roller includes a plurality of second gear parts which are disposed on an inner circumference surface of the transfer roller, and
the first gear parts engage with the second gear parts.

2. The roller imprinter according to claim 1,
wherein the at least two tension rollers also serve as pinch rollers.

3. The roller imprinter according to claim 1,
wherein the transfer roller is an aluminum cylindrical roller having a surface defined by nanometer-sized cavities formed by anodization.

4. The roller imprinter according to claim 1,
wherein the transfer roller has an aluminum thin film coating on the outer surface of a cylindrical glass or ceramic roller and nanometer-sized cavities on the film.

5. The roller imprinter according to claim 1,
wherein the transfer roller further includes a cooling mechanism.

6. The roller imprinter according to claim 5,
wherein the cooling mechanism includes:
a fin disposed on the inner surface of the transfer roller or a cylindrical fin disposed on the inner surface side of the transfer roller; and
a duct for supplying a cooling fluid to the fin or the cylindrical fin.

7. A roller imprinter for transferring a pattern on a surface of a transfer roller to a surface of a workpiece sheet through rotation of the transfer roller, comprising:
a vertically movable transfer roller;
a shaft disposed within the transfer roller and outside of the axial center of the transfer roller, and
at least two tension rollers, wherein
the sheet is made strained between the at least two tension rollers while the transfer roller is suspended above the sheet by the shaft, and the transfer roller is brought into contact with the sheet by movement of the shaft, and
the pattern includes nanometer-sized protrusions and recesses,
the shaft includes a plurality of first gear parts which are spaced one another along a longitudinal direction of the shaft,
the transfer roller includes a plurality of second gear parts which are disposed on an inner circumference surface of the transfer roller, and the first gear parts engage with the second gear parts.

8. The roller imprinter according to claim 7,
wherein the at least two tension rollers also serve as pinch rollers.

9. The roller imprinter according to claim 7,
wherein the transfer roller is an aluminum cylindrical roller having a surface defined by nanometer-sized cavities formed by anodization.

10. The roller imprinter according to claim 7,
wherein the transfer roller has an aluminum thin film coating on the outer surface of a cylindrical glass or ceramic roller and nanometer-sized cavities on the film.

11. The roller imprinter according to claim 7,
wherein the transfer roller further includes a cooling mechanism.

12. A method of producing from a workpiece sheet, an imprint sheet having a surface with a pattern formed thereon, the method comprising:
suspending a transfer roller in a non-contact position from a workpiece sheet by a shaft;
straining the workpiece sheet between a plurality of tension rollers; and then
bringing the workpiece sheet into contact with a transfer roller having a surface with a pattern formed thereon, wherein
bringing the sheet into contact with the transfer roller includes moving the shaft disposed within the transfer roller,
the shaft includes a plurality of first gear parts which are spaced one another along a longitudinal direction of the shaft,
the transfer roller includes a plurality of second gear parts which are disposed on an inner circumference surface of the transfer roller, and
the first gear parts engage with the second gear parts.

13. The production method according to claim 12,
wherein at least two of the plurality of tension rollers also serve as pinch rollers.

14. A roller imprinter for transferring a pattern on a surface of a transfer roller to a surface of a workpiece sheet through rotation of the transfer roller, comprising:
a shaft within the transfer roller, the shaft being movable across the diameter of the transfer roller without rotation of the transfer roller; and
at least three other rollers, wherein
the sheet is made strained between at least two of the other rollers while the transfer roller is suspended above the sheet by the shaft, and the sheet is brought into contact with the transfer roller by at least three of the other rollers,
the shaft includes a plurality of first gear parts which are spaced one another along a longitudinal direction of the shaft,
the transfer roller includes a plurality of second gear parts which are disposed on an inner circumference surface of the transfer roller, and the first gear parts engage with the second gear parts.

* * * * *